United States Patent
Gerrard

(10) Patent No.: US 9,206,665 B2
(45) Date of Patent: Dec. 8, 2015

(54) COATINGS FOR DOWNHOLE SEAL MATERIALS AND METHOD OF MAKING THE SAME

(75) Inventor: David Peter Gerrard, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 1652 days.

(21) Appl. No.: 12/180,748

(22) Filed: Jul. 28, 2008

(65) Prior Publication Data

US 2010/0019456 A1    Jan. 28, 2010

(51) Int. Cl.
| | |
|---|---|
| *B32B 9/00* | (2006.01) |
| *E21B 33/10* | (2006.01) |
| *C01B 31/02* | (2006.01) |
| *F16J 15/10* | (2006.01) |
| *E21B 10/00* | (2006.01) |

(52) U.S. Cl.
CPC .............. *E21B 33/10* (2013.01); *C01B 31/022* (2013.01); *F16J 15/102* (2013.01); *E21B 10/00* (2013.01)

(58) Field of Classification Search
CPC .......... C01B 31/022–31/0293; C01B 2202/00; E21B 10/00
USPC .................... 428/408; 423/447.1; 977/742
See application file for complete search history.

(56) References Cited

U.S. PATENT DOCUMENTS

| | | | |
|---|---|---|---|
| 5,461,107 A | 10/1995 | Amin et al. | |
| 6,518,324 B1 | 2/2003 | Kresta et al. | |
| 6,805,904 B2 | 10/2004 | Anders et al. | |
| 7,045,087 B2* | 5/2006 | Kotov | 264/255 |
| 7,094,464 B2* | 8/2006 | Mao et al. | 428/319.3 |
| 2003/0122111 A1* | 7/2003 | Glatkowski | 252/500 |
| 2005/0109502 A1* | 5/2005 | Slay et al. | 166/179 |
| 2005/0161212 A1 | 7/2005 | Leismer et al. | |
| 2007/0044958 A1* | 3/2007 | Rytlewski et al. | 166/250.01 |
| 2007/0142547 A1 | 6/2007 | Vaidya et al. | |
| 2008/0121436 A1 | 5/2008 | Slay et al. | |

OTHER PUBLICATIONS

Kim, Y.S. et al., "Conductive Thin Films on Functionalized Polyethylene Particles", Chemistry of Materials, vol. 18, p. 2997(2006).

Jang, W.S. et al., "Robotic Dipping System for Layer-By-Layer Assembly of Multifunctional Thin Films", Review of Scientific Instruments, vol. 76, Art. No. 103904, (2005); and.

Grunlan, J.C. et al., "Effect of Clay Concentration on Oxygen Permeability and Optical Properties of a Modified Poly (Vinyl Alcohol)," Journal of Applied Polymer Science, vol. 93, p. 1102, (2003).

* cited by examiner

*Primary Examiner* — Daniel H Miller
(74) *Attorney, Agent, or Firm* — Cantor Colburn LLP

(57) ABSTRACT

Disclosed herein is a seal element comprising a seal coating. The seal element comprises a substrate, and a seal coating disposed on a surface of the substrate, wherein the seal coating comprises a layer of a nanoparticle material.

17 Claims, 2 Drawing Sheets

COATINGS FOR DOWNHOLE SEAL MATERIALS AND METHOD OF MAKING THE SAME

BACKGROUND

In a variety of subterranean environments, such as wellbore environments, downhole tools are used in many applications. For example, downhole tools may be used during the exploration, drilling, completion, production, reworking, and stimulation of petroleum reservoirs. Examples of downhole tools can include, for example, packers, safety valves, flow controllers, gas lift valves, sliding sleeves, and other tools. These downhole tools often have parts that are sealed with respect to each other via polymeric seal components.

A wellbore or other subterranean region, however, can create a harsh environment for many materials, including conventional polymeric materials. Extreme heat, high differential pressures, chemical attack, and other factors can lead to deterioration and failure of such seal materials. Consequently, materials and methods improving the reliability and long-term performance of seal elements would be well received in the art.

Moreover, issues with respect to the detrimental effect of environments on seal materials can be found in many other sealing applications. Examples can include, without limitation, automotive, fluid transport, hydraulic actuation, and other like applications where it is important to provide a seal between two components.

BRIEF DESCRIPTION OF THE INVENTION

Disclosed herein is a seal element comprising a seal coating. The seal element comprises a substrate, and a seal coating disposed on a surface of the substrate, wherein the seal coating comprises a layer of a nanoparticle material.

Further disclosed herein is a method for the manufacture of a seal element. The method includes coating a substrate of the seal element with a layer a nanoparticle material to form a seal coating.

In another embodiment, the seal element is disposed between two components of a downhole tool system. The downhole tool system comprises a first downhole component; a second downhole component positioned relative to the first downhole component; and a seal element positioned in sealable communication with the first and the second downhole components, wherein the seal element comprises a substrate, and a coating disposed on a surface of the substrate, wherein the coating comprises a layer of a nanoparticle material.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed article and method are presented herein by way of exemplification and not limitation with reference to the Figures.

Disclosed herein are seal element coatings and seals having coatings for protecting the seals and enhancing the life of seal bearing parts. The seal coatings and seal elements can be employed in any application where it is necessary to form a seal between components. Exemplary applications for the seal elements can include, without limitation, automotive, fluid transport, hydraulic actuation, and the like. The seal coatings and seal elements can be particularly useful in applications where the application environment can have detrimental effects on existing seal elements and application components. In one embodiment, the seal element coatings can protect seals and seal bearing parts found in downhole tool components. The coatings are useful for seal elements employed in a variety of downhole equipment, such as tools used for hydrocarbon fluid exploration, drilling, completion, production, reworking, simulation, and the like.

Figure 1:
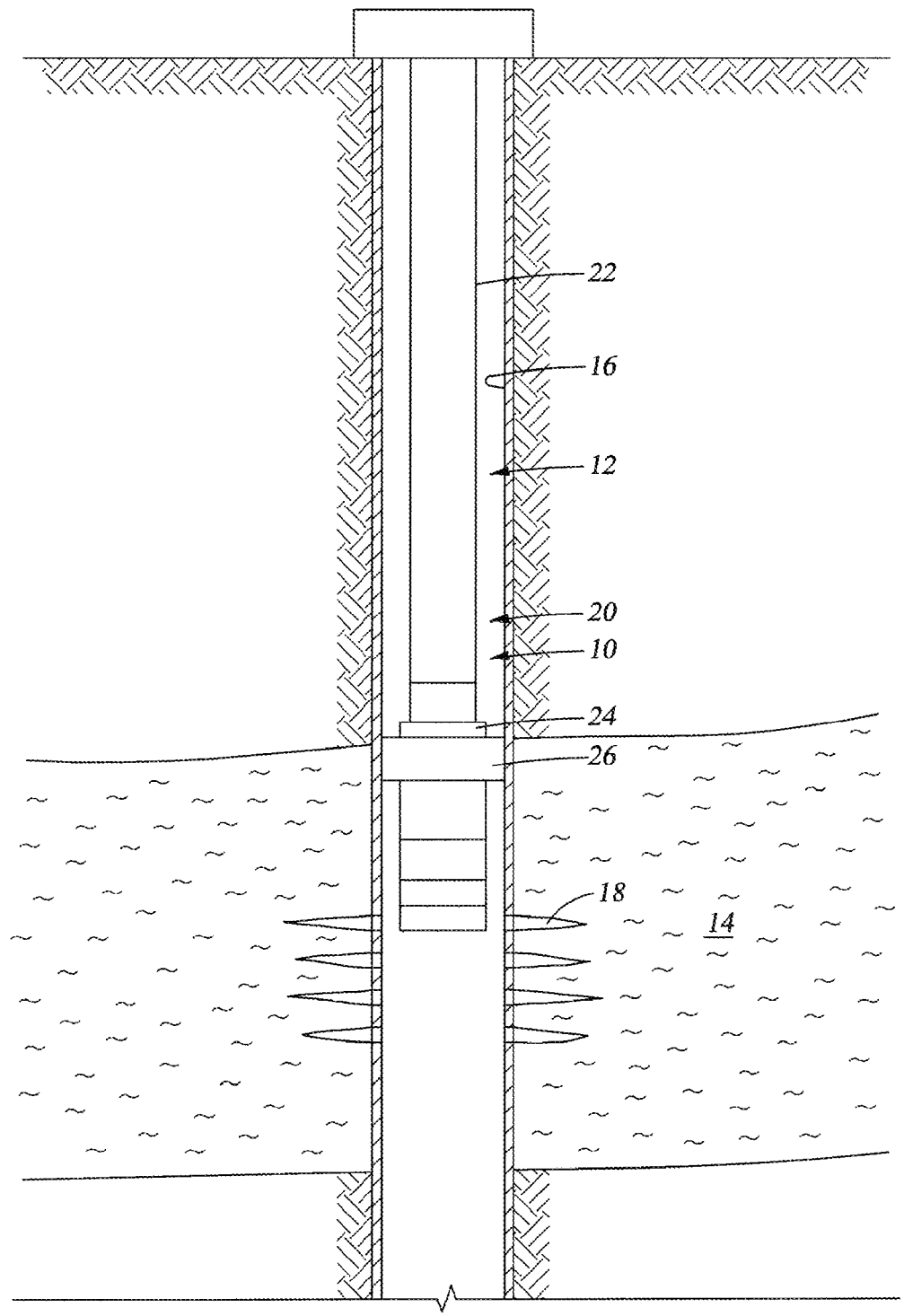
FIG. 1 depicts a front cross-sectional view of a completion positioned in a wellbore and having downhole tools.

Referring to the drawings in general and to FIG. 1 in particular, it will be understood that the illustrations are for the purpose of describing a particular embodiment of the seal coatings and seal elements disclosed herein and are not intended to be limited thereto. FIG. 1 is a schematic cross-sectional view of an exemplary completion, positioned in a wellbore, comprising downhole tools. Reference herein will be made to the use of the seal elements in the downhole tool components of the completion. It is to be understood, however, that the seal coatings and seal elements disclosed herein, can be advantageously used in any system, process, or application wherein seals and seal bearing parts can be disposed in harsh environments that can reduce the operating life of the seals and lead to deterioration or failure of the seal materials. Therefore, the coatings and methods disclosed herein, are not limited to use in the specific downhole applications described.

Referring to FIG. 1, a downhole system is schematically illustrated and generally designated 10. In this embodiment, system 10 is located in a subterranean environment within a wellbore 12. Wellbore 12 is drilled or otherwise formed in a geological formation 14 containing, for example, desirable production fluids, such as hydrocarbon based fluids. Wellbore 12 may be lined with a casing 16 having perforations 18 through which fluids flow between geological formation 14 and the interior of wellbore 12.

In this embodiment, downhole tools 20 are deployed within the wellbore 12 by a deployment system 22. The downhole tools 20 in FIG. 1 comprise, among other things, a packer 24 having a sealing element 26. The sealing element 26 can be activated between a radially contracted state and an expanded state to form a seal with casing 16, as illustrated. In other embodiments, a variety of different downhole tools can be employed in the system 10 for various process steps, such as exploring, drilling, production, and the like.

Figure 2:
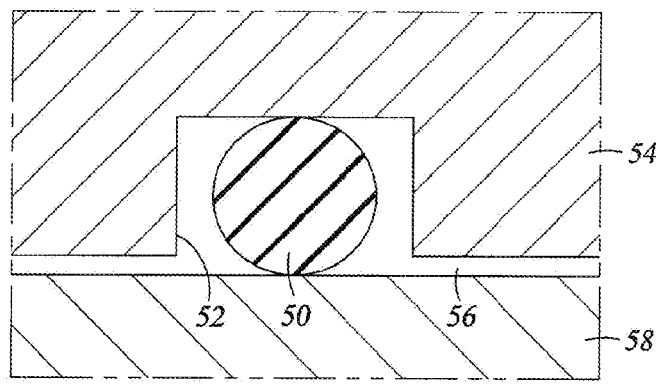
FIG. 2 depicts a partial cross-sectional view of an O-ring seal.

Numerous downhole tools utilize seal elements to provide static and dynamic sealing between stationary and moving tool components. The sealing element 26 of the packer 24 in FIG. 1 is one example of seal element utilized in a downhole tool. Static seal elements involve sealing surfaces that do not move relative to one another, and dynamic seal elements involve sealing surfaces that do move relative to one another. The term seal element can describe any device used to close a gap or make a joint fluid-tight with respect to liquids, gases, or both. Current seal elements are generally comprised of polymeric or elastomeric materials. The current seal elements can be susceptible to numerous types of downhole seal failures, such as, for example, extrusion, spiral failure, abrasion, chemical degradation, thermal degradation, explosive decompression, and the like. FIG. 2 illustrates an example of a seal element, an O-ring 50. The O-ring 50 is positioned within a groove 52 of tubular component 54 and extends across a gap 54 between tubular component 54 and tubular component 58. In this configuration, O-ring seal 50 prevents the passage of fluid pressure through gap 56 from one side of O-ring 50 to the other. It should be noted that O-rings are one of the simplest and most versatile types of seal with a wide range of applications. For example, O-ring seal 50 can be used in downhole tools wherein tubular component 54 and tubular component 58 are stationary relative to one another, or wherein tubular component 54 and tubular component 58 move relative to one another in either a translational action, a rotational action, or both.

Figure 3:
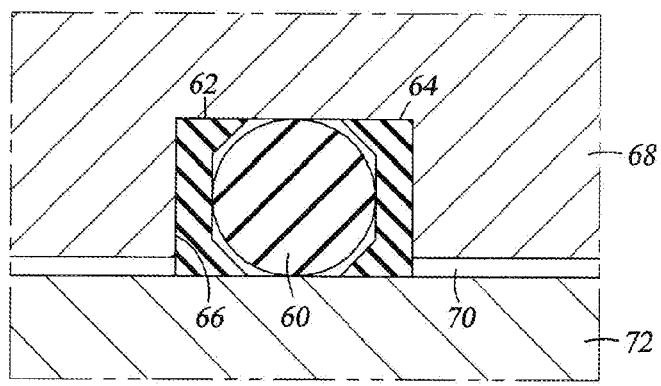
FIG. 3 depicts a partial cross-sectional view of the O-ring seal of FIG. 1 with back-up rings.

In certain high pressure applications, current O-rings may be susceptible to extrusion into the gap between components. In such situations, as seen in FIG. 3, an O-ring seal 60 may be used in conjunction with one or more back-up rings 62, 64. As illustrated, O-ring seal 60 and back-up rings 62, 64 are positioned within a groove 66 of tubular component 68 and extend across a gap 70 between tubular component 68 and tubular component 72. Together, the O-ring seal 60 and back-up rings 62, 64 prevent the passage of fluid pressure through gap 70 from one side of O-ring seal 60 to the other.

In addition to O-ring and back-up ring seals, there are a variety of other types of seal elements having a wide array of geometries that can be used in downhole tool components. While an example of an O-ring seal for use in downhole tools has been described, the coatings and methods to be described herein are equally applicable to other types of seal elements including, without limitation, D-rings, V-rings, T-rings, X-rings, U-cups, chevron seals, lip seals, flat seals, symmetric seals, gaskets, stators, valve seats, tubing, packing elements, wipers, bladders, and other like sealing elements.

Each of the seal elements for downhole tools described above can comprise a coating on the seal substrate to improve various properties of the seal element and/or enhance the useful life of the seal element, and therefore, the useful life of the downhole tools. In an exemplary embodiment, the coating can be effective to improve one or more of the properties of the seal element, including, for example, improvements in tensile strength, compressive strength, tear/shear strength, modulus, compression set, chemical resistance, thermal resistance, explosive decompression resistance, heat/electrical conductivity, and the like. The coating can be conformal (i.e., the coating conforms to the surfaces of a seal element substrate). Moreover, an exemplary coating can be deposited onto the internal surfaces of a stator to reduce the swelling and wear often associated with rubber stators in downhole environments.

Figure 4:
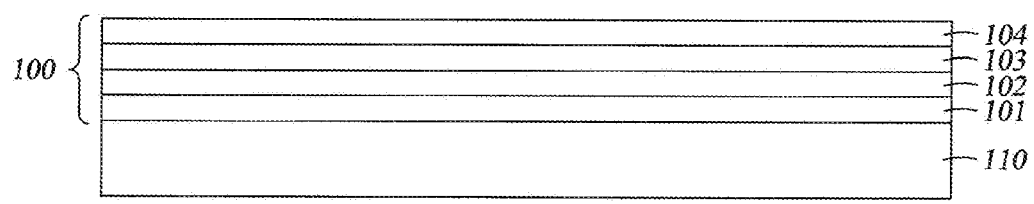
FIG. 4 depicts a schematic diagram showing an exemplary embodiment of a layer-by-layer assembled thin film seal coating on a seal element substrate.

The seal coatings described herein advantageously comprise a layer of nanoparticles. In some embodiments, the seal coatings can further comprise a layer of a polar binding material, to form a bilayer with the nanoparticles. This bilayer of nanoparticles and polar binding material can be in the form of a thin film on a substrate surface of the seal element. In some embodiments, the seal coating can comprise multiple layers, wherein the layers repeat such that one layer of nanoparticles is disposed between two layers of polar binding material. In another exemplary embodiment, the seal coating comprises multiple bilayers arranged so that each layer of nanoparticles is disposed between two layers of polar binding material. FIG. 4 illustrates an example of this embodiment, wherein the seal coating 100 is disposed on and in intimate contact with a seal element substrate 110. The seal coating 100 comprises two bilayers (i.e., four layers in total). Reference numerals 102 and 104 represent the nanoparticle layers, and reference numerals 101 and 103 represent the binding layers. The nanoparticle layers can comprise the same nanoparticles, or they may be different. Likewise, the binding layers can comprise the same binding materials, or they may be different. The number of layers in the coating, as well as the overall coating thickness, can depend upon the particular seal element application, configuration, substrate composition, component tolerance, and the like. In an exemplary embodiment, the coating can have a thickness effective to improve the material properties of the seal element, without negatively affecting any critical tolerances for the downhole tool components. Exemplary thicknesses for the seal coating on the seal element can be from about 10 nanometers (nm) to about 100 micrometers (μm), specifically about 20 nm to about 500 nm, and more specifically about 50 nm to about 200 nm.

The nanoparticle layer of the thin film seal coating has a greater surface area than both the binding layer and the seal substrate surface due to the nano-size and volume of the nanoparticles. The structure of the nanoparticle layer, therefore, can form interfacial interactions with the binding layers, including van der Waals and cross-linking interactions to improve the properties of the seal elements, such as chemical resistance. Moreover, the nanoparticles can be small enough to fill the voids found in current seal elements that liquids and gases can enter. The seal coating, therefore, can help prevent swelling of the seal element caused by fluid absorption in the seal surface. The nanoparticle layer comprises nanoparticles having a particle size scale in the range of about 0.1 nm to about 500 nm, specifically about 1 nm to about 200 nm, and more specifically about 3 nm to about 50 nm. Exemplary nanoparticle fillers are nanoclay materials. Nanoclays (nano-sized clays) are plate-like materials, the clay mineral being generally selected from smectite, vermiculite and halloysite clays. The smectite clay in turn can be selected from montmorillonite, saponite, beidellite, nontrite, hectorite and mixtures thereof. In an exemplary embodiment, the nanoparticle layer comprises the montmorillonite clay, a layered aluminosilicate. The nanoclay platelets generally have a thickness of about 3 to about 1000 Angstroms and a size in the planar direction ranging from about 0.01 μm to 100 μm. The aspect ratio (length versus thickness) is generally in the order of about 10 to about 10,000. The montmorillonite clay platelets can be separated by a gallery, a space between parallel layers of clay platelets containing various ions holding platelets together. Exemplary nanoclay materials can include those commercially available from Southern Clay Products, Inc. of Austin, Tex. The thickness of each nanoparticle layer can be about 0.1 nm to about 500 nm, specifically about 0.5 nm to about 200 nm, more specifically about 1 nm to about 50 nm, and even more specifically about 3 nm to about 20 nm.

The binding layer is disposed on a selected one or both sides of the nanoparticle layer to bind the nanoparticles and form the bilayer of the thin film seal coating. Exemplary materials for forming the binding layer will include those materials having the thermal and chemical resistance properties to withstand the conditions found in harsh environments, such as those found in downhole applications. Moreover, the exemplary materials for the binding layer can separate the nanoparticles enough that they can slide over each other in order to form coating layers. Exemplary binding layer materials can include, without limitation, ionic molecules, such as salts, polymers, oligomers, and the like. The polymer materials can be any long or short-chained polymers (including copolymers, and the like) that have a chemical polarity appropriate for bonding with the nanoparticle layer of the seal coating. An example of such a polymer material can be a polar polymer. In one embodiment, the polar polymer can be cross-linked to provide stretchability to the seal coating in order to accommodate the surface strains typically experienced by a flexible seal element employed in a downhole tool. Exemplary polar polymers can include thermoplastics and thermosets, such as, without limitation, polycarbonate, poly(acrylic acid), poly(methacrylic acid), polyoxide, polysulfide, polysulfone, fluoropolymers (e.g., polytetrafluoroethylene), polyamide, polyester, polyurethane, polyimide, poly(vinyl acetate), poly(vinyl alcohol), poly(vinyl chloride), poly(vinyl pyridine), poly(vinyl pyrrolidone), copolymers thereof, epoxies, and combinations thereof. Exemplary polymer binding layer materials can also include elastomers, specifically polar fluoroelastomers. Exemplary fluoroelastomers are copolymers of vinylidene fluoride and hexafluoropropylene and terpolymers of vinylidene fluoride, hexafluoropropylene and tetrafluoroethylene. The fluoroelastomers used in the polymeric layer can be elastomers that comprise vinylidene fluoride units (VF2 or VdF), hexafluoropropylene units (HFP), tetrafluoroethylene units (TFE), chlorotrifluoroethylene (CTFE) units, and/or perfluoro(alkyl vinyl ether) units (PAVE), such as perfluoro(methyl vinyl ether)(PMVE), perfluoro(ethyl vinyl ether)(PEVE), and perfluoro(propyl vinyl ether)(PPVE). These elastomers can be homopolymers or copolymers. Specifically exemplary polymeric layer materials are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, tetrafluoroethylene units, and the like. Exemplary polar fluoroelastomers can include those commercially available from Dupont and Daikin Industries, Ltd. The thickness of each binding layer can be about 1 nm to about 10 μm, specifically about 1 nm to about 500 nm, and more specifically about 10 nm to about 100 nm.

In an optional embodiment, the seal coating can further comprise a reinforcing layer. The reinforcing layer can provide additional strength, toughness, wear resistance, extrusion resistance, degradation resistance, and the like to the seal element. The reinforcement layer can be disposed on top of the nanoparticle layer or the bilayer of the seal coating, or the reinforcement layer can be disposed between the bilayers when a multiple bilayer coating exists. The reinforcement layer comprises nano-tubes and/or nano-fibers. Nano-tubes can be formed as multiwall nano-tubes, single wall nano-tubes, or arrays of nano-tubes. Also, nano-tubes can be formed from a variety of materials, one example of which is carbon. Carbon nano-tubes impart combinations of improved mechanical, thermal and electrical properties to the seal coating. For example, carbon nano-tube reinforcement layers can be used to substantially increase the tensile strength of the seal coating 100, to increase the current carrying capacity of the seal coating, and to increase the heat transfer capability of the seal coating. The enhancement of such properties can be beneficial in a variety of downhole components, such as some of those discussed above. Nano-fibers, on the other hand, can be made from, for example, graphite, carbon, glass, cellulose substrate, and polymer materials.

Deposition of the individual layers on the seal substrate to form the seal coating can comprise any suitable deposition method known to those having skill in the art. Exemplary deposition methods, can include, without limitation, film casting, spin casting, dip coating, spray coating, layer-by-layer build-up techniques, and the like. Formation of the coated downhole seal as described herein is not intended to be limited to any particular coating method.

In an exemplary embodiment, the seal coating 100 is formed on the seal substrate surface 110 using a layer-by-layer (LbL) technique. As used herein, LbL coating (i.e., deposition or assembly) refers to a seal coating obtained by physical deposition of a charged binding material and a non-charged nanoparticle filler material, or a non-charged binding material and a charged nanoparticle filler material, or a charged binding material and a charged nanoparticle filler material, on an article. As is known, the LBL process involves alternating exposure of an ionized substrate to dilute aqueous solutions of polycations and polyanions or otherwise complementary species. With each exposure, a polyion layer is deposited and surface ionization is reversed, allowing a subsequent complementary layer (e.g., of opposite charge) to be deposited. Smooth and uniform composite films of any thickness and composition can be created to meet a wide variety of applications. Polymers that can be used in formation of film by the LBL process include poly(pyrrole), poly(aniline), poly(2-vinylpyridine), poly(viologen), poly(3,4-ethylene dioxythiopene), poly(styrene sulfonate), poly(8-(4-carboxy-phenoxy)-octyl acrylate), poly(3-(4-pyridyl)-propyl acrylate), poly(vinyl alcohol), poly(2-vinylpyridine), poly(acrylic acid), poly(methyl methacrylate), poly(D,L-lactide), poly(thiophene-3-acetic acid), poly(allylamine hydrochloride), poly(lysine), poly(ethyleneimine), poly (2-acrylamido-2-methyl-1-propane-sulfonic acid), and poly(dimethylsiloxane).

In an LbL coating, each layer of the binding material is non-covalently bonded to the layer of nanoparticle filler material. Any suitable deposition techniques can be used in the LbL coating. Exemplary deposition techniques can include, without limitation, dipping the seal element into a coating solution, spraying the seal element with a coating solution, brush coating the seal element with a coating solution, roll coating the seal element with a coating solution, spin casting the seal element with a coating solution, combinations thereof, and the like. A "charged binding material" or a polyionic material refers to a charged polymer material that has a plurality of charged groups in a solution, or a mixture of charged polymers each of which has a plurality of charged groups in a solution. Exemplary charged polymer binding materials include those polar polymers described above for use in the binding layer of the coating.

The term "bilayer", therefore, as employed herein is intended to encompass, a coating structure formed by alternatively applying, in no particular order, one layer of a first charged material and one layer of a non-charged material or a second charged material, wherein the first material can be either the polar binding or the nanoparticle filler material and the second material can be the opposite thereof. It should also be understood that the layers of the polar binding material and the nanoparticle filler material may be intertwined with each other in the bilayer.

While an inherently charged surface is attractive for substrates used in LbL assembly of an seal coating, it is not necessary and will depend on the desired substrate material of the seal element for a given downhole application. A range of methods are known in the art that can be used to charge the surface of the seal element substrate, including, without limitation, plasma processing, corona processing, flame processing, and chemical processing (e.g., etching, micro-contact printing, and chemical modification), and the like. For example, plastics used as seal element substrates, can be chemically modified to present polar or charged functional groups on the surface to which the seal coating will be deposited. The layers are deposited onto the charged substrate surface when the substrate is sprayed, dipped, or the like with/in a solution of oppositely charged material (i.e., the nanoparticle filler or the polymeric material). The material is adsorbed onto the surface due to the electrostatic interactions. The surface charge is now reversed, and after a rinsing (e.g. with water) and drying step, the substrate can be sprayed, dipped, or the like with/in a solution of the second material (i.e., the material opposite the first). Repeated adsorption, rinsing, and drying gives rise to the seal coating described herein, composed of the desired number of layers depending upon the intended application.

The LbL technique of applying the seal coating to a seal element offers several advantages over other thin film deposition methods, as well as other downhole seal element improvement techniques in general. One exemplary advantage of the LbL coating method is the high degree of control over coating thickness, which comes about due to the linear growth of the films with the number of bilayers. By the fact that each bilayer can be as thin as about 1 nm, this method offers relatively easy control over the thickness of the coating within 1 nm resolution. The seal coatings can be deposited onto a seal in a thickness effective to impart the improved properties discussed above to the seal, without affecting the design tolerances of the downhole tool components. The thin film coated seal elements described herein, therefore, can replace the seal elements found in existing downhole tool components without requiring modification of the tool designs.

Another advantage of forming the seal coating by the LbL technique is that the rate of swelling of the seal element can be substantially inhibited. Seal swelling, or a growth in the physical dimensions and volume of the seal, is dependant mainly on the affinity of the molecular species of the fluid surrounding the seal to the chemical structure of the bulk seal material. As the seal elements swells under the absorption and permeation of the fluid, the stiffness and mechanical strength of the seal decreases. By slowing the rate of swelling and therefore the rate at which mechanical properties decrease and physical dimensions increase, a boundary coating can substantially improve the overall operational performance of a sealing component. Applying the thin film seal coating with the LbL technique increases the distance that diffusing species must travel through in order to enter the bulk of the seal's body. This increased distance, or tortuous path, is defined by the boundaries of the nanoparticles (e.g., the nanoclay platelets), and very small gaps that separate them in directions normal to and parallel to the surface of the coating. As the diffusion distance is increased, the effective rate that a species passes through the coating will decrease. The effects of an increased diffusion distance, or tortuosity, can be measured indirectly by conducting either diffusion or swell rate measurements. Diffusion rate measurements are based on identifying the rate a chemical species passes through a body, while swell rate measurements involve measuring a body's change in volume over time as a result of the body's exposure to a given fluid. Diffusion and swell rates are influenced by coatings in general and are commonly used to characterize a coating's effectiveness.

The seal coatings and methods described herein can impart improved strength, toughness, wear resistance, chemical resistance, thermal resistance, explosive decompression resistance, heat/electrical conductivity, and the like, to the seal elements found in a wide variety of downhole tool components and applications. The coatings comprise materials suitable for the severe environmental conditions found in downhole surroundings. The seal coatings are useful for seal elements employed in a variety of downhole production equipment, such as tools used for hydrocarbon fluid exploration, drilling, completion, production, reworking, simulation, and the like. Moreover, the LbL coating technique used to deposit the seal coating on the seal element substrate can impart a coating of varying composition, thickness, or bilayer structure, based on the desired application of the seal. Even further, the coating can be applied as a film so thin that the critical component tolerances are not affected, while being thick enough to impart the properties described above on the seal.

The terminology used herein is for the purpose of describing particular embodiments only and is not intended to be limiting of the invention. Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A seal element for providing a seal between two components, the seal element comprising:
    a substrate; and a seal coating, disposed on a surface of the substrate, wherein the seal coating comprises multiple bilayers of a nanoparticle material and a layer of a polar binding material disposed on the layer of nanoparticle material having a layer-by-layer (LbL) structure, wherein each successive layer of nanoparticle material and polar binding material has a charge opposite that of the preceding layer of nanoparticle material or polar binding material.

2. The seal element of claim 1, wherein the seal coating further comprises a layer of polar binding material disposed on the surface of the substrate and the layer of nanoparticle material is disposed on the layer of polar binding material.

3. The seal element of claim 1, wherein the seal coating comprises alternating layers of the nanoparticle material and the binding material.

4. The seal element of claim 1, wherein the nanoparticle material is a nanoclay.

5. The seal element of claim 4, wherein the nanoclay comprises vermiculite, halloysite, smectite, or a combination comprising at least one of the foregoing clays, wherein the smectite clay comprises montmorillonite, saponite, beidellite, nontrite, hectorite, or a combination comprising at least one of the foregoing smectite clays.

6. The seal element of claim 1, wherein the polar binding material comprises an ionic molecule, an oligomer, a polymer, or a combination comprising at least one of the foregoing.

7. The seal element of claim 1, wherein the polar binding material is a fluoroelastomer, wherein the fluoroelastomer comprises a copolymer of vinylidene fluoride and hexafluoropropylene, terpolymers of vinylidene fluoride, hexafluoropropylene and tetrafluoroethylene, or a combination comprising at least one of the foregoing.

8. The seal element of claim 1, wherein the seal element is disposed in a downhole tool.

9. The seal element of claim 1, wherein the seal element comprises a seal selected from the group consisting of O-ring seals, back-up rings, D-rings, V-rings, T-rings, X-rings, U-cups, chevron seals, lip seals, flat seals, symmetric seals, gaskets, stators, valve seats, tubing, packing elements, bladders, and wipers.

10. The seal element of claim 1, wherein the layer of nanoparticle material has a thickness of about 1 nanometer to about 50 nanometers.

11. The seal element of claim 1, wherein the layer of polar binding material has a thickness of about 1 nanometer to about 500 nanometers.

12. The seal element of claim 1, further comprising a reinforcing layer disposed on the layer of nanoparticle material, wherein the reinforcing layer comprises nano-tubes.

13. The seal element of claim 12, wherein the nano-tubes comprise carbon.

14. A method for the manufacture of a seal element, the method comprising:
coating a substrate of the seal element with multiple successive bilayers of a polar binding material and a nanoparticle material in a layer-by-layer (LbL) buildup to form a seal coating, wherein each successive layer of nanoparticle material and polar binding material has a charge opposite that of the preceding layer of nanoparticle material or polar binding material.

15. The method of claim 14, wherein coating the substrate comprises:
charging a surface of a seal element substrate; and
depositing multiple successive bilayers by repeatedly depositing a first layer of a selected one of the nanoparticle material and the polar binding material, followed by
depositing a second layer of a selected one of the nanoparticle material and the polar binding material to form a bilayer, wherein the selected material is opposite of the selected material for the first layer.

16. The method of claim 15, further comprising depositing a reinforcing layer on the bilayer, wherein the reinforcing layer comprises carbon nanotubes.

17. A downhole tool system, comprising:
a first downhole component;
a second downhole component positioned relative to the first downhole component; and
a seal element positioned in sealable communication with the first and the second downhole components, wherein the seal element comprises a substrate, and a coating disposed on a surface of the substrate, wherein the coating comprises multiple bilayers of a nanoparticle material and a layer of a polar binding material disposed on the layer of nanoparticle material having a layer-by-layer (LbL) structure, wherein each successive layer of nanoparticle material and polar binding material has a charge opposite that of the preceding layer of nanoparticle material or polar binding material.

* * * * *